United States Patent

Lee et al.

[11] Patent Number: 5,969,848
[45] Date of Patent: Oct. 19, 1999

[54] MICROMACHINED ELECTROSTATIC VERTICAL ACTUATOR

[75] Inventors: Abraham P. Lee, Walnut Creek; Gary E. Sommargren, Santa Cruz; Charles F. McConaghy, Livermore; Peter A. Krulevitch, Pleasanton, all of Calif.

[73] Assignee: The Regents of the University of California, Oakland, Calif.

[21] Appl. No.: 08/888,000

[22] Filed: Jul. 3, 1997

[51] Int. Cl.⁶ .................................................. G02B 26/08
[52] U.S. Cl. .......................... 359/298; 359/291; 310/328; 361/283.1; 250/310; 73/24.06
[58] Field of Search ..................... 359/291, 298, 359/315; 310/328, 20; 250/310; 361/283.1; 73/24.06

[56] References Cited

U.S. PATENT DOCUMENTS 5,025,346  6/1991  Tang et al. ............................. 361/283.1
5,689,362  11/1997  Kadota ..................................... 359/298
5,751,683  5/1998  Kley ........................................ 250/310

Primary Examiner—Loha Ben
Attorney, Agent, or Firm—L. E. Carnahan

[57] ABSTRACT

A micromachined vertical actuator utilizing a levitational force, such as in electrostatic comb drives, provides vertical actuation that is relatively linear in actuation for control, and can be readily combined with parallel plate capacitive position sensing for position control. The micromachined electrostatic vertical actuator provides accurate movement in the sub-micron to micron ranges which is desirable in the phase modulation instrument, such as optical phase shifting. For example, compact, inexpensive, and position controllable micromirrors utilizing an electrostatic vertical actuator can replace the large, expensive, and difficult-to-maintain piezoelectric actuators. A thirty pound piezoelectric actuator with corner cube reflectors, as utilized in a phase shifting diffraction interferometer can be replaced with a micromirror and a lens. For any very precise and small amplitudes of motion' micromachined electrostatic actuation may be used because it is the most compact in size, with low power consumption and has more straightforward sensing and control options.

18 Claims, 5 Drawing Sheets

MICROMACHINED ELECTROSTATIC VERTICAL ACTUATOR

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to actuators, particularly to micromachined actuators, and more particular to micromachined electrostatic vertical actuators, for applications such as optical phase shifting.

In recent years numerous micro electromechanical systems (MEMS) devices have been developed. The laterally driven electrostatic comb resonant structure has become an integrated component in many of these MEMS devices. This same device generates levitation force on the suspended structure due to the asymmetric distribution of electrical fields as a bias voltage is applied. This levitation force is often the source of unwanted out-of-plane motion causing tilting to many laterally-driven sensors and actuators. Instead of suppressing the vertical motion it would be desirable to use this levitation force for controllable small vertical motions (<1.5 $\mu$m). Other electrostatic vertical motion sensors and actuators typically utilize the parallel plate capacitor effect which is much more nonlinear in nature and has an unstable region of operation, complicating the fabrication and control of the devices. Mechanical stoppers as well as more complicated electrode configurations are often necessary to fabricate parallel plate vertical actuators.

The present invention utilizes the levitation force for providing controllable small vertical motions (<1.5 $\mu$m), and involves a micromachined electrostatic vertical actuator. The present invention can be utilized in various applications involving optical phase shifting, such as Fabry-Perot interferometry or phase shifting-based interferometry. The present invention utilizes a levitation force, such as in electrostatic comb drives, to provide vertical actuation that is relatively linear in actuation for control, and can be readily combined with parallel plate capacitive position sensing for position control, for accurate movement in the submicron to micron ranges, which is desirable in phase modulation instruments.

SUMMARY OF THE INVENTION

It is an object of the present invention to provide a micromachined vertical actuator.

A further object of the invention is to provide a micromachined electrostatic vertical actuator for optical phase shifting.

A further object of the invention is to provide a micromachined vertical actuator utilizing electrostatic actuation for producing very precise and small amplitudes of motion.

A further object of the invention is to provide a vertical actuator utilizing electrostatic actuation and which is compact in size, has low power consumption, and has straightforward sensing and control options.

Another object of the invention is to provide a micromachined electrostatic vertical actuator which utilizes the electrostatic levitation force to provide vertical actuation that is relatively linear in actuation for control, and can be integrated with parallel plate capacitive position sensing for position control.

Another object of the invention is to provide an electrostatic vertical actuator that enables accurate movement in sub-micron to micron ranges desirable in phase modulation instruments.

Another object of the invention is to provide electrostatic vertical actuators utilizing compact, inexpensive and position controllable micromirrors which can replace the large, expensive, and difficult to maintain piezoelectric actuators.

Another object of the invention is to replace a large (30 pound) piezoelectric actuator with corner cube reflectors of a phase shifting diffraction interferometer with a micromirror and a lens.

Another object of the invention is to provide a micromachined electrostatic vertical actuator for optical phase shifting applications, such as in Fabry-Perot interferometry or phase shifting-based interferometry.

Other objects and advantages of the present invention will become apparent from the following description and accompanying drawings. Basically, the invention involves micromachining electrostatic vertical actuators for optical phase shifting applications. The actuator of the invention utilizes a levitation force, such as generated in an electrostatic comb device, to provide vertical actuation that is relatively linear in actuation for control, and can be combined with parallel plate capacitive position sensing for position control. The micromachined electrostatic vertical actuator provides accurate movement in the sub-micron to micron ranges, and thus has application in various phase modulation instruments. The micromachined electrostatic vertical actuator is embodied, for example, as a compact, inexpensive, and position controllable micromirror to replace the large, expensive, and difficult-to-maintain piezoelectric actuator in a phase shifting diffraction interferometer; and more particularly replace a thirty (30) pound piezoelectric actuator with corner cube reflectors of a phase shifting diffraction interferometer with a micromachined micromirror and a lens.

The micromachined electrostatic vertical actuator has various applications in the field of optical phase shifting, for example, and in addition to uses such as in phase shifting diffraction interferometers, can be used in phase modulation at the end of fiber optics to provide a communication modulator. Also, the invention has potential use for spatial light modulation in adaptive optics, and an array of these micromirrors has potential for displays, beam steering, etc.

BRIEF DESCRIPTION OF THE DRAWINGS

The accompanying drawings which are incorporated into and form part of the disclosure, illustrate embodiments of the invention and, together with the written description serve to explain the principles of the invention.

DETAILED DESCRIPTION OF THE INVENTION

The present invention is directed to a micromachined electrostatic vertical actuator for optical phase shifting. For very precise and small amplitudes of motion, electrostatic actuation is the most compatible in size, with low power consumption and more straightforward sensing and control options. As pointed out above, the laterally driven electrostatic comb drive resonant structure has become an integral component in numerous MEMS devices over the last decade. This laterally driven electrostatic device generates levitation force on the suspended structure due to the asymmetric distribution of electrical fields as a bias voltage is applied. The levitation force is often the source of unwanted out-of-plane motion causing tilting to many laterally-driven sensors and actuators. Vertical motion sensors and actuators typically utilize the parallel plate capacitor effect which is nonlinear in nature and has an unstable region of operation, complicating the fabrication and control of the device. Because the parallel plate electrostatic actuation is nonlinear in nature, mechanical stoppers and complicated electrode/insulator configurations are often necessary to prevent the plates from collapsing as well as shorting out. The present invention, instead of attempting to suppress the above-described unwanted out-of-plane motion caused by the generated levitation force, utilizes this levitation force for controllable small vertical motions (<1.5$\mu$m). The invention, by utilizing the levitation force, such as in electrostatic comb devices, provides vertical actuation that is relatively linear in actuation for control, and can be readily combined with parallel plate capacitive position sensing for position control. This type of accurate movement in the submicron to micron ranges is desirable in the phase modulation instruments, for example. Applications for the invention are currently in optics such as Fabry-Perot interferometry or phase shifting-based interferometry, but may be used in phase modulation at the end of fiber optics to provide a communication modulator, as well as spatial light modulation in adaptive optics.

The present invention is embodied as a micromirror; and these compact, inexpensive, and position controllable micromirrors can replace the large, expensive, and difficult-to-maintain piezoelectric actuators. Also, an array of these micromirrors has potential for displays, beam steering, etc. In the illustrated application of the invention on a phase shifting diffraction interferometer, a 30 pound piezoelectric actuator with corner cube reflectors is replaced with a micromirror and a lens.

Figure 1:
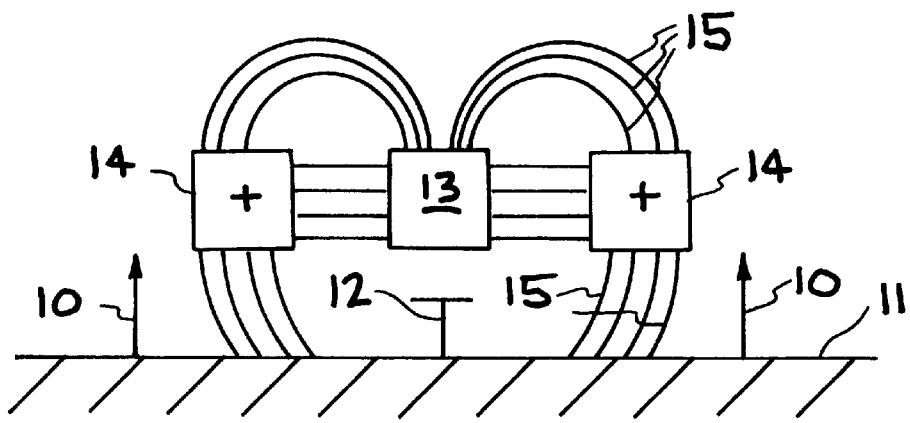
FIG. 1 illustrates the principles of vertical levitation of comb drive through asymmetric distribution of electric fields.

Levitation force is generate through the asymmetric distribution of electrostatic field lines as shown in FIG. 1, with the levitation force being indicated by arrows 10 extending from a surface 11. If a bias voltage indicated at 12 is applied between a pair of stationary combs 14 and a movable comb 13, then a resultant upward force, indicated by arrows 10, will be generated by electrostatic field lines 15. This force 10 is balanced with mechanical suspension force in folded beam flexures, as described in detail hereinafter with respect to FIG. 3A.

Figure 2A:
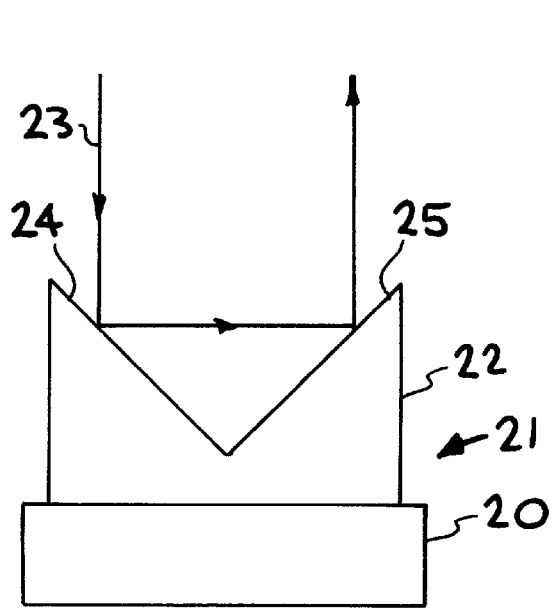
FIG. 2A schematically illustrates a prior art piezoelectric actuator with corner cube reflectors to be replaced in a phase shifting diffraction interferometer by the micromachined micromirror and lens of FIG. 2B.
Figure 2B:
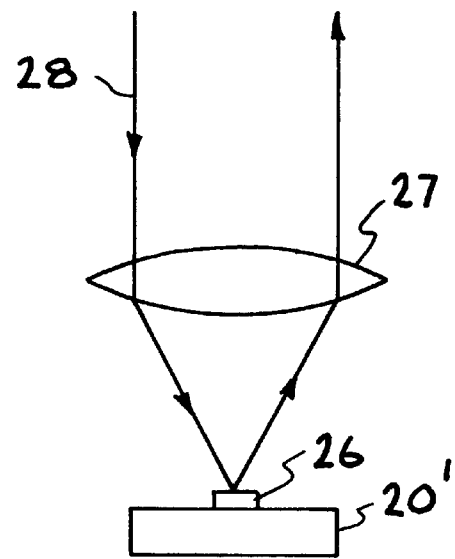
FIG. 2B schematically illustrates an embodiment of the present invention utilizing a micromirror assembly and a lens.

FIG. 2A schematically illustrates a typical phase shifter 21 with piezoelectric actuator 20 and corner cube reflectors 22 on actuator 20 wherein a beam 23 is reflected from a reflector surface 24 to a reflector surface 25 of reflector 22 and back in the opposite direction from which it came as indicated by the propagation arrow. This 30 pound piezoelectric actuator 21 of FIG. 2A may be replaced by a compact, inexpensive, and in situ position controllable electrostatically-driven micromirror, as illustrated in FIG. 2B, for phase shifting. FIG. 2B schematically illustrates a substrate 20' with a micromirror assembly 26 mounted thereon, and a lens 27 spaced from micromirror assembly 26, wherein a beam 28 passes through lens 27 onto the micromirror 26 and is reflected back through lens 27 in the opposite direction from where it came as indicated by the propagation arrow. A specific embodiment of a micromirror 26 is illustrated in FIG. 3A.

Figure 3A:
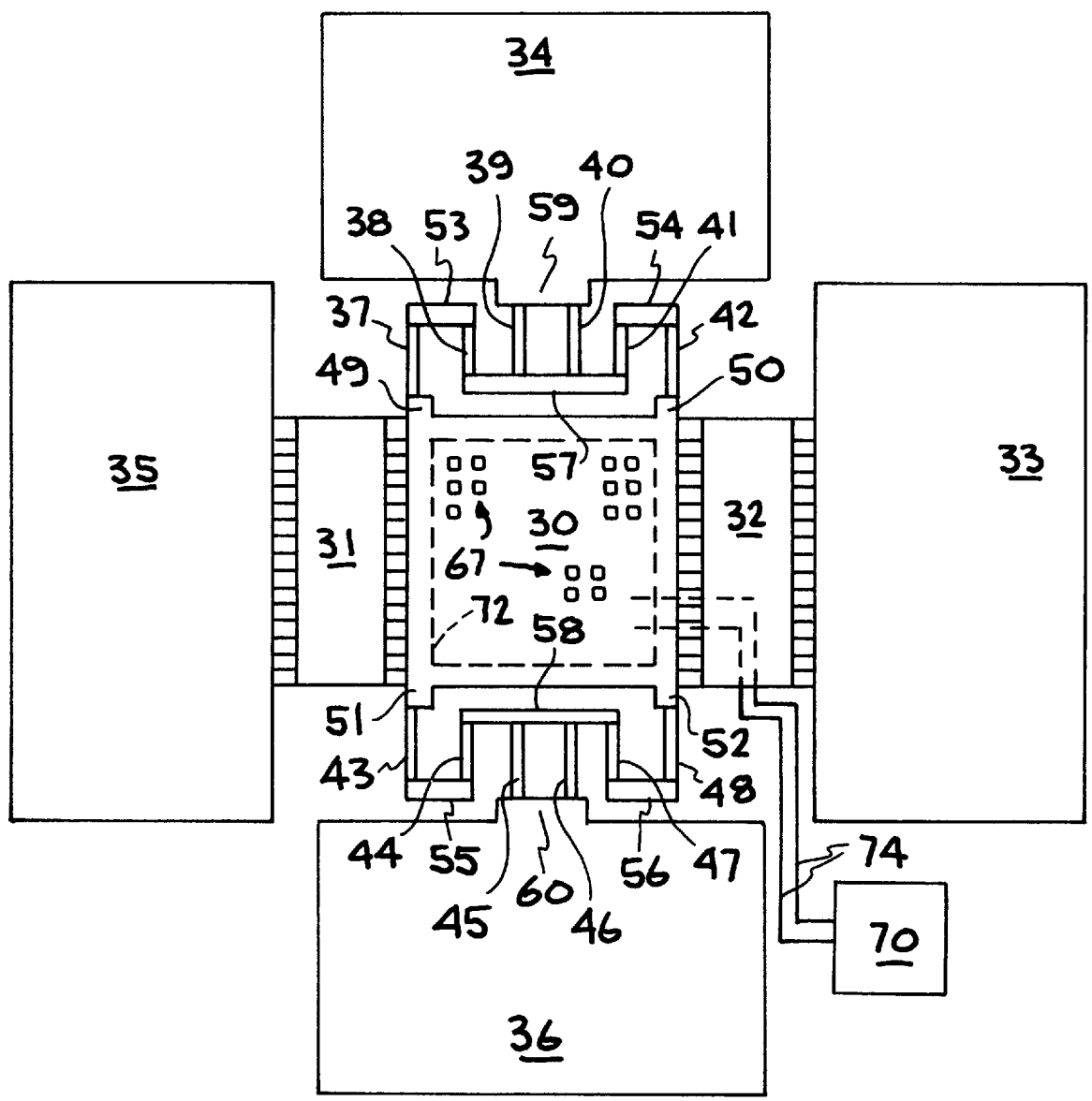
FIG. 3A is a top view of an electrostatic comb drive for vertical actuation of a microactuator made in accordance with the present invention.
Figure 3B:
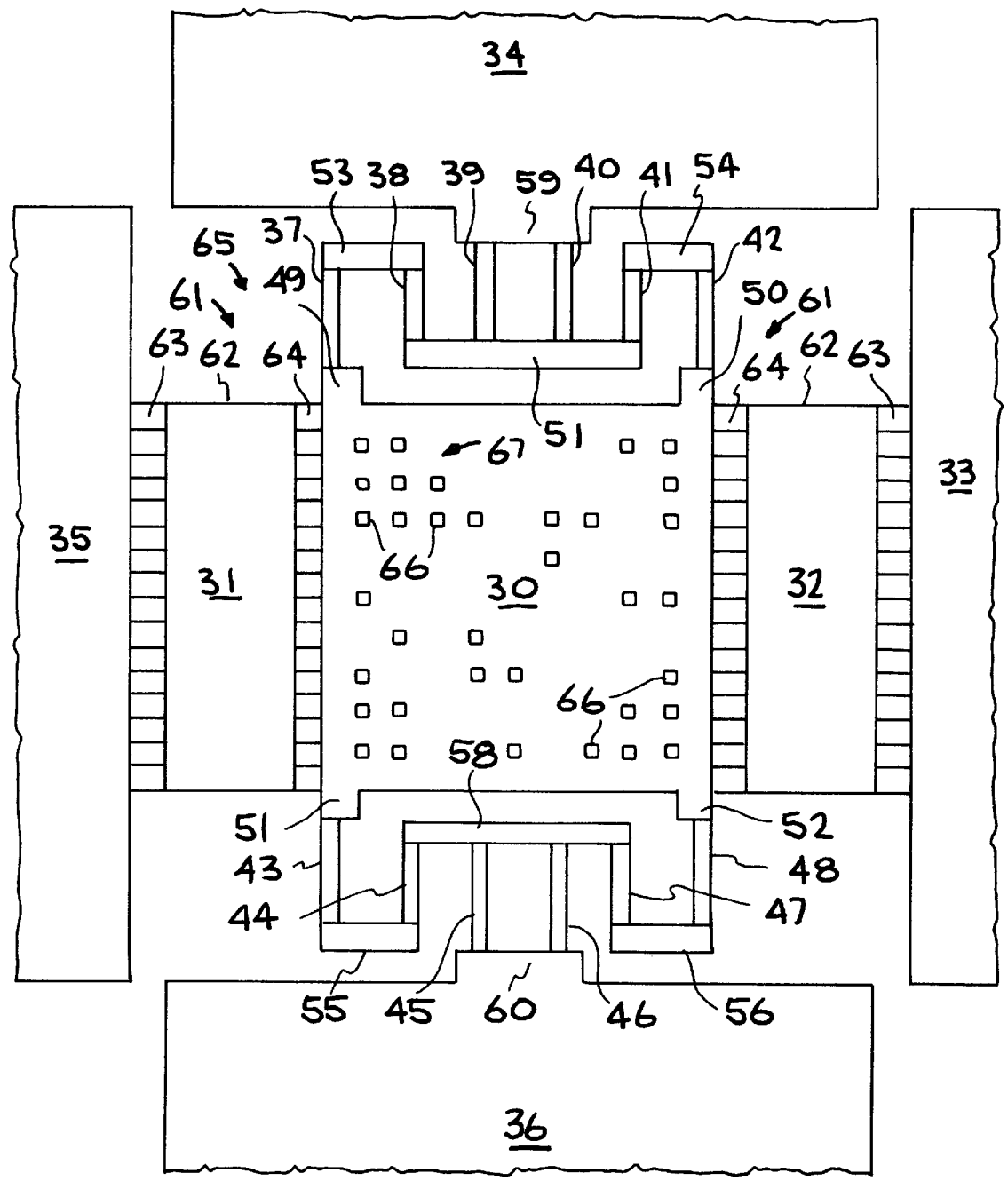
FIGS. 3B, 3C and 3D illustrate enlarged sections of the microactuator of FIG. 3A.
Figure 3C:
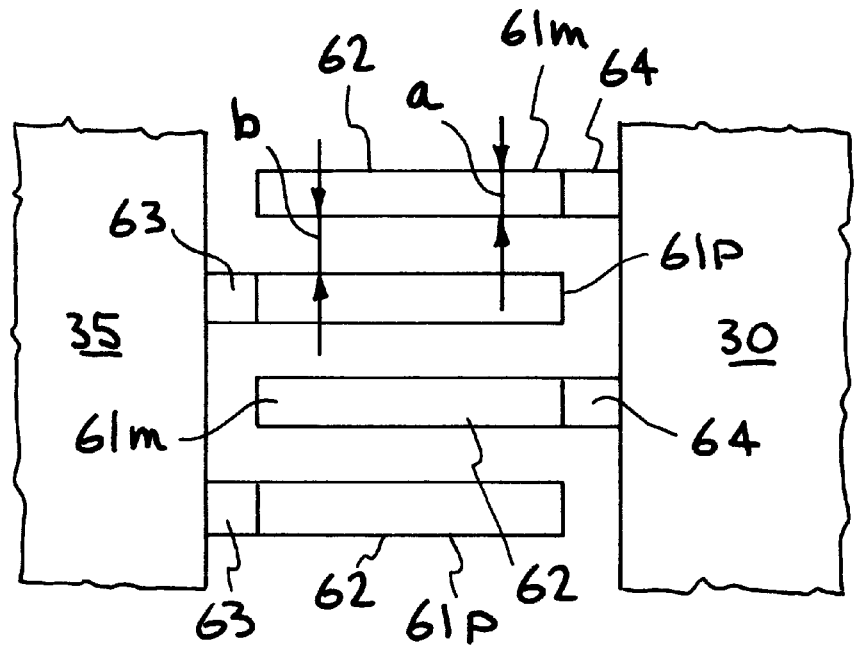
Figure 3D:
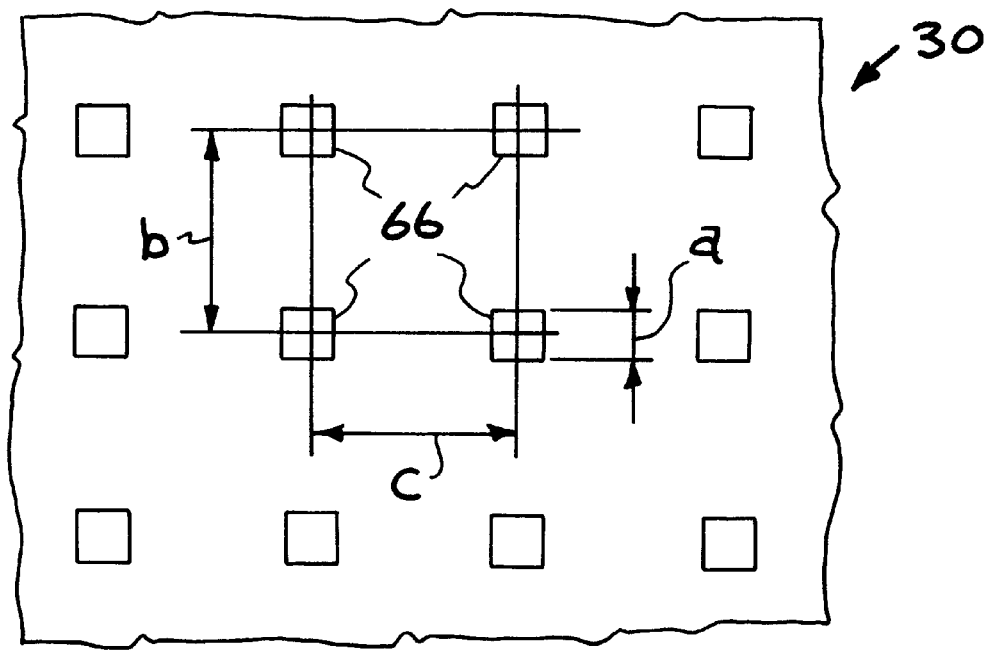
Figure 4:
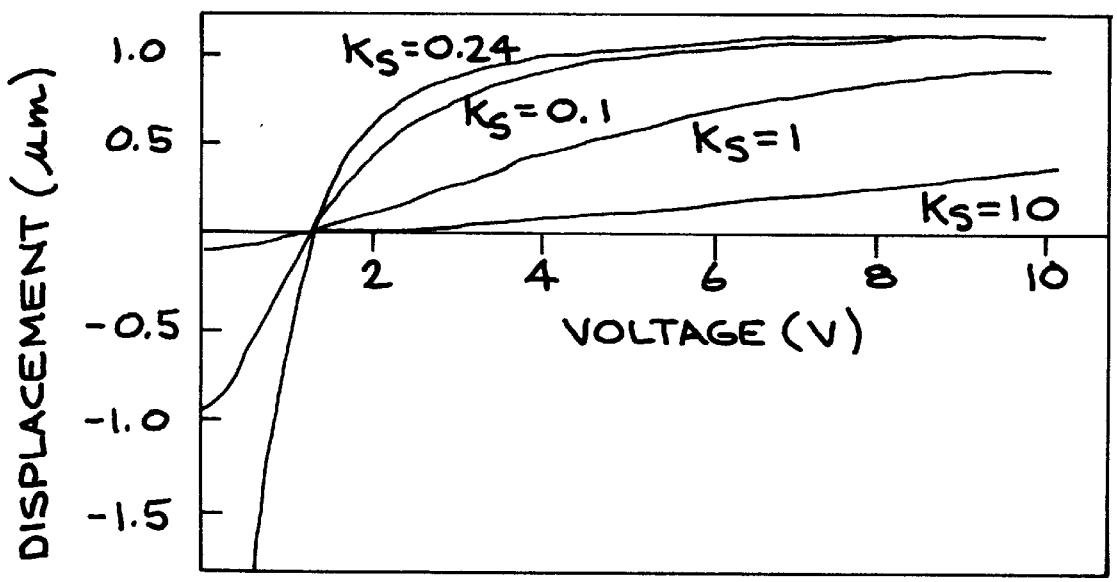
FIG. 4 graphically illustrates voltage vs. displacement of the FIG. 3A actuator of the present invention with various mechanical spring constants.
Figure 5:
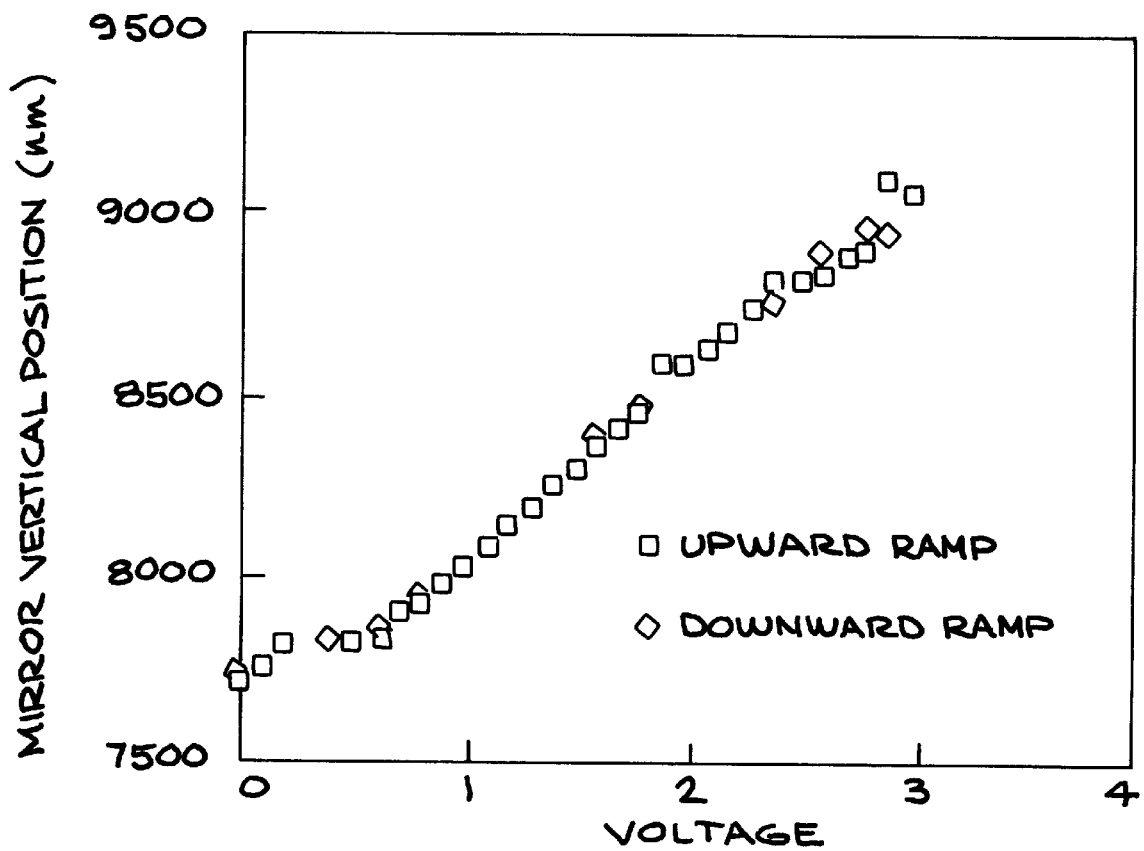
FIG. 5 graphically illustrates measured voltage vs. displacement (mirror position vs. bias levitation voltage) on a micromirror device.

FIG. 3A illustrates a top view layout of a micromirror suspended by folded beam flexures with comb drives for vertical actuation on two opposite sides of the micromirror, with FIGS. 3B, 3C and 3D showing enlarged sections of the FIG. 3A micromirror. Equilibrium between the electrostatic force and the folded beam flexure mechanical spring force provides the first order static equation. The electrostatic force is a function of the bias voltage applied and the position of the actuator. The mechanical spring force is a function of the position of the actuator. Combining the two results in the plot of FIG. 4, illustrates voltages vs. displacement curves for different mechanical spring constants Ks(units in $\mu$N/$\mu$m). FIG. 5 illustrates the result of voltage versus position as measured from a Zygo interferometry system (mirror position vs. bias levitation voltage). This provides a design guide for vertical comb-driven actuators. Also accomplished is position sensing utilizing a parallel plate capacitive sensing configuration underneath the micromirror.

Referring now to an overall embodiment of an example of a microactuator for an interferometer as illustrated in FIG. 3A, with FIG. 3B showing an enlarged view of the micromirror and interdigitated fingers of FIG. 3A, FIG. 3C illustrating a further enlarged section of the interdigitated fingers of FIG. 3B, and FIG. 3D illustrating a further enlarged section of the micromirror of FIG. 3B. FIG. 3A shows a top view of the layout of an electrostatic comb drive for vertical actuation of a micromirror generally indicated at 30 having a dimension of 1000 $\mu$m by 1000 $\mu$m. Arrays 31 and 32 of interdigitated fingers are located on opposite sides of micromirror 30, and having a length of 1000 $\mu$m and width of 550 $\mu$m, and about which are located four (4) silicon pads 33, 34, 35 and 36, so as to provide an overall width and length of 8000 $\mu$m by 8000 $\mu$m. A plurality of folded beam flexures (six shown) are positioned at opposite ends of micromirror 30 intermediate the micromirror and silicon pads 34 and 36. Each of the folded beam flexures, shown in FIGS. 3A, B has a 15 $\mu$m width. These folded beam flexures intermediate micromirror 30 and silicon pad 34 are indicated at 37, 38, 39, 40, 41 and 42, while those intermediate micromirror 30 and silicon pad 36 are indicated at 43, 44, 45, 46, 47 and 48. Outer folded beam flexures 37, 42, 43 and 48 are connected to micromirror 30 at extending end sections 49, 50, 51 and 52. Outer ends of folded beam flexures 37–38, 41–42, 43–44 and 47–48 are interconnected by bars 53, 54, 55 and 56 having a width of 50 $\mu$m and length of 200 $\mu$m, with the beam flexures 37–42 and 43–48 being spaced apart by 200 $\mu$m and having a length of 400 $\mu$m, with extending end sections 49–52 of micromirror 30 having a width of 92.5 $\mu$m and extending 50 $\mu$m from the micromirror end surface. Inner ends of beam flexures 38–41 and 44–47 are connected to connector bars 57 and 58, respectively, having a width of 15 μm and length of 400 μm, and spaced 30 μm from end surfaces of the micromirror 30. Outer ends of beam flexures 39–40 and 45–46 are connected to protruding end sections 59 and 60 of silicon pads 34 and 36, with end sections 59 and 60 having a height of 100 μm and width of 300 μ.

As shown in FIG. 3B, the arrays 31 and 32 of interdigitated fingers located on opposite sides of micromirror 30 each consist, for example, of a multiplicity of individual fingers 61 (80 fingers, for example, connected to the micromirror 30 and 80 more connected to the pad.) Only two fingers of each subset of an array (designated 61m to the mirror and 61p to the pad) are shown individually in FIG. 3C for simplicity of the illustration. One subset is the set that is stationary and connected to the silicon pad electrodes. The other subset is the moving set connected to the micromirror. As seen in FIG. 3B, each of the fingers 61 has a center section 62 having a length of 450 μm and end sections 63–64 each having a length of 50 μm, with end sections 63 being adjacent silicon pads 33 and 35, and with end sections 64 being adjacent micromirror 30. As seen in FIG. 3C, which illustrates a section of array 31 as indicated at arrow 65 of FIG. 3B, the interdigitated fingers 61m and 61p of each array 31 have a width indicated at arrow "a" of 10 μm and are spaced apart as indicated at arrow "b" by 2 μm. The fingers 61m and 61p may be constructed of polycrystalline silicon, single crystalline silicon or metals and have a thickness of 1 μm to 500 μm. On one array the fingers 61m are connected to the micromirror and on the other set, the fingers 61p are connected to the silicon pad electrodes.

The micromirror 30 may be constructed of polycrystalline silicon, single crystalline silicon or metals with a thickness of 1 μm to 500 μm, and includes rows of evenly spaced etched holes or openings 66. Openings 66 are for sacrificial etching of material beneath the mirror. A section of micromirror 30, as indicated at arrow 67 in FIG. 3B, is illustrated greatly enlarged in FIG. 3D. The multiplicity of holes 66 have a width of 4 μm, as indicated at arrow "a", and holes of a square configuration would have sides of 4 μm. The holes 66 are spaced apart by 60 μm as indicated at arrows "b" and "c" in FIG. 3D.

FIG. 3A also shows in dashed lines a capacitor electrode 72 which is positioned under micromirror 30 and capacitor electrode 72 is connected to capacitor pad 70 through lines 74. The capacitor 72 measures the position of the mirror 30.

In operation, the FIG. 3A microactuator operates as follows: As a voltage is applied between the micromirror and the stationary silicon pad electrode, the interdigitated fingers will have the potential difference to levitate the moving fingers and micromirror. Therefore, controlling the voltage controls the vertical levitation position.

It has thus been shown that the present invention provides a micromachined electrostatic vertical actuator especially adapted for optical phase shifting. The microactuator is compact, inexpensive, and position controllable, and can produce accurate movement in the sub-micron and micron ranges, and is thus compatible with phase modulation instruments. The microactuator can be readily combined with parallel plate capacitive position sensing for position control. A capacitive sensing pad beneath the micromirror provides the position for feedback control.

While particular embodiments of the invention have been described and illustrated along with materials, parameters, etc. to exemplify and explain the principles of the invention, such are not intended to be limiting. Modifications and changes may become apparent to those skilled in the art, and it is intended that the invention be limited only by the scope of the appended claims.

The invention claimed is:

1. In a phase modulation instrument having an electrostatic comb drive, the improvement comprising:

a micromachined electrostatic vertical actuator utilizing levitation force in the electrostatic comb drive to provide relatively linear vertical actuation, said electrostatic vertical actuator being combined with a parallel plate capacitor of the phase modulation instrument to sense and control vertical position, said electrostatic vertical actuator including a micromirror, a plurality of arrays of interdigitated fingers, and a plurality of silicon pads.

2. The improvement of claim 1, wherein said plurality of arrays of interdigitated fingers are positioned adjacent opposite sides of said micromirror.

3. The improvement of claim 2, wherein each of said arrays of interdigitated fingers include a multiplicity of spaced individual interdigitated fingers.

4. The improvement of claim 1, wherein said micromirror includes a multiplicity of spaced holes.

5. The improvement of claim 4, wherein said multiplicity of spaced holes in said micromirror are positioned in equally spaced rows.

6. The improvement of claim 1, wherein said micromirror includes projecting sections.

7. The improvement of claim 6, additionally including a plurality of folded beam flexures, each beam flexure being operatively connected to a projecting section of said micromirror.

8. The improvement of claim 7, additionally including a plurality of folded beam flexures located intermediate said beam flexures operatively connected to said projecting section of said micromirror, and bar means operatively connecting outer beam flexures to adjacent beam flexures, and connector bar means operatively connecting said intermediate located beam flexures, said intermediate located beam flexures being operatively connected to an associated silicon pad.

9. The improvement of claim 8, wherein said adjacent silicon pads are located in a spaced relation with end sections of said micromirror.

10. The improvement of claim 8, wherein said connector bar means is located in spaced relation to end sections of said micromirror.

11. The improvement of claim 8, wherein said intermediate located beam flexures being operatively connected to projecting sections of silicon pads.

12. A micromachined electrostatic vertical actuator for optical phase shifters including:

a micromirror assembly and a lens;

a micromirror;

a pair of interdigitated finger arrays; and a plurality of silicon pads positioned about said micromirror and said pair of interdigited finger arrays.

13. The electrostatic vertical actuator of claim 12, wherein said micromirror is of a substantially square configuration, and provided with a multiplicity of holes therein.

14. The electrostatic vertical actuator of claim 13, wherein said pair of interdigitated finger arrays is located adjacent two sides of said micromirror and each array includes a multiplicity of individual spaced interdigitated fingers.

15. The electrostatic vertical actuator of claim 14, wherein said plurality of silicon pads comprises four in number, two of said silicon pads being located adjacent said interdigitated finger arrays, and two of said silicon pads being located in spaced relation to two sides of said micromirror.

16. The electrostatic vertical actuator of claim 15, additionally including a plurality of folded beam flexures located intermediate said micromirror and an associated silicon pad, certain of said folded beam flexures being operatively connected to said micromirror and certain of said folded beam flexures being operatively connected to said associated silicon pad.

17. The electrostatic vertical actuator of claim 16, wherein each of said folded beam flexures operatively connected to said micromirror is connected to an adjacent folded beam flexure by a bar, wherein said adjacent folded beam flexures are connected to a connector bar located in spaced relation to said micromirror, and wherein said folded beam flexures operatively connected to said associated silicon pad are connected to said connector bar.

18. The electrostatic vertical actuator of claim 17, wherein said plurality of folded beam flexures comprises a row of six in number at each of two sides of said micromirror, wherein an outer two beam flexures of each row are connected to an extended corner section of said micromirror, and wherein inner two beam flexures of each row are connected to a projecting section of each of said associated silicon pads.

* * * * *